United States Patent
Takahashi

(10) Patent No.: US 7,367,722 B2
(45) Date of Patent: *May 6, 2008

(54) FRONT AND REAR CURTAIN SHUTTER DEVICE WITH START AREA

(75) Inventor: Masaya Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/702,336

(22) Filed: Feb. 5, 2007

(65) Prior Publication Data

US 2007/0133982 A1 Jun. 14, 2007

Related U.S. Application Data

(63) Continuation of application No. 10/965,149, filed on Oct. 14, 2004, now Pat. No. 7,182,530.

(30) Foreign Application Priority Data

Oct. 15, 2003 (JP) .............................. 2003-355460

(51) Int. Cl.
*G03B 9/08* (2006.01)
(52) U.S. Cl. ........................................ 396/464; 396/469
(58) Field of Classification Search ................. 396/469, 396/463, 464; 310/308–310
See application file for complete search history.

(56) References Cited

U.S. PATENT DOCUMENTS 4,313,659 A * 2/1982 Saito et al. ................. 396/463
5,523,639 A 6/1996 Okamoto et al.
6,818,287 B1 * 11/2004 Ogawa et al. ........... 428/292.1
2002/0037171 A1 3/2002 Kasahara

FOREIGN PATENT DOCUMENTS

JP 8-220592 8/1996
JP 08-220592 * 8/1996

OTHER PUBLICATIONS

US 5,682,420, 1/1999, Akimoto et al. (withdrawn).

* cited by examiner

*Primary Examiner*—Diane I. Lee
*Assistant Examiner*—Chia-how Michael Liu
(74) *Attorney, Agent, or Firm*—Scully, Scott, Murphy & Presser, P.C.

(57) ABSTRACT

A shutter device includes a stationary plate having a plurality of driving electrodes movable element opposes the stationary plate and including a sheet subjected to an electret-forming process. A drive control unit for moving the movable element using variation in electrostatic force, thereby shielding light. The electrostatic force is generated between constant charges held in the movable element as a result of the electret-forming process, and charges generated in each of the driving electrodes when a voltage is applied to each driving electrode. The generated electrostatic force is varied by varying the voltage applied to each driving electrode.

4 Claims, 6 Drawing Sheets

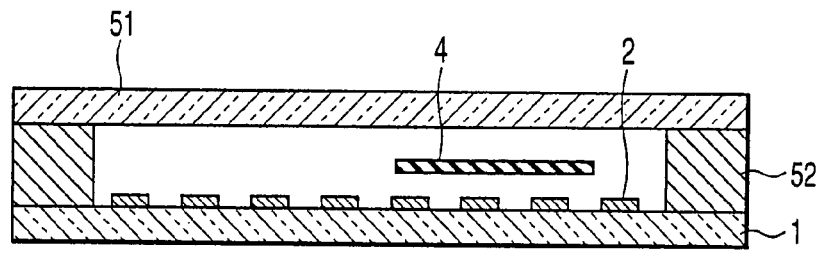
F I G. 11
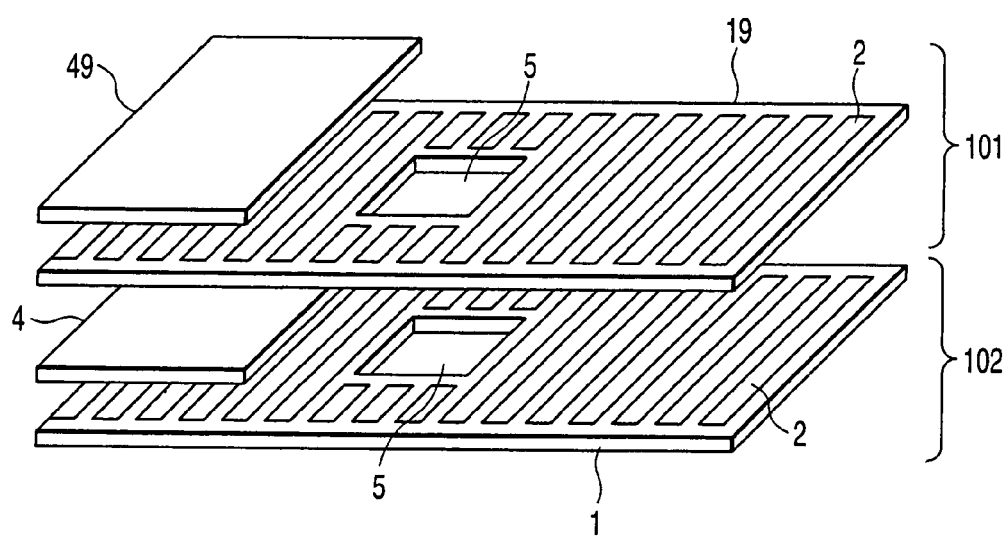
F I G. 12

FRONT AND REAR CURTAIN SHUTTER DEVICE WITH START AREA

CROSS-REFERENCE TO RELATED APPLICATIONS

This application is a continuation application of U.S. application Ser. No. 10/965,149, filed Oct. 14, 2004, now U.S. Pat. No. 7,182,530, which is based upon and claims the benefit of priority from prior Japanese Patent Application No. 2003-355460, filed Oct. 15, 2003, the entire contents of each of which are incorporated herein by reference.

BACKGROUND OF THE INVENTION

1. Field of the Invention

The present invention relates to a shutter device.

2. Description of the Related Art

Various mechanisms for acquiring a compact shutter device of a simple structure for use in, for example, cameras have been proposed so far. For example, the shutter mechanism disclosed in Jpn. Pat. Appln. KOKAI Publication No. 8-220592 comprises a stationary element having beltlike electrodes arranged with a predetermined pitch and a light-passing opening, and a movable element provided movable to the stationary element for shielding the opening from light or permitting light to pass therethrough, the movable element having a resistor layer opposing the electrodes of the stationary element. The shutter mechanism further comprises a drive control section for varying the voltage applied to the electrodes of the stationary element. In other words, this shutter mechanism is an induction electrostatic actuator. The shutter mechanism controls the movement of the movable element to control the light-passing time or area of the opening. This structure enables the movable element as a shutter curtain to be directly controlled. As a result, the opening/closure of the shutter can be accurately controlled by a simple mechanism.

BRIEF SUMMARY OF THE INVENTION

The present invention aims to provide a shutter device capable of driving a shutter at a high speed with a low voltage.

Advantages of the invention will be set forth in the description which follows, and in part will be obvious from the description, or may be leaned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 9 is a flowchart illustrating the procedure of control performed in the drive control circuit upon turn on;

FIG. 11 is a view illustrating a structural example in which the movable element is sealed; and FIG. 12 is a view illustrating the structure of a focal plane shutter device according to a second embodiment of the invention.

DETAILED DESCRIPTION OF THE INVENTION

Embodiments of the invention will be described in detail with reference to the accompanying drawings.

First Embodiment

Figure 1:
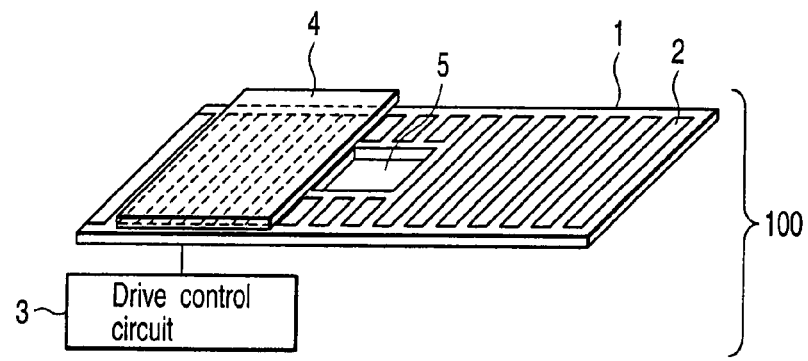
FIG. 1 is a schematic view illustrating a shutter device according to a first embodiment of the invention.

FIG. 1 is a schematic view illustrating a shutter device 100 according to a first embodiment of the invention. As shown, the shutter device 100 includes a stationary plate 1, movable element 4, and drive control circuit 3. The stationary plate 1 is provided with a plurality of beltlike driving electrodes 2 arranged at regular intervals, and an opening 5 for passing therethrough light that enters the shutter device 100. The movable element 4 is a sheet member opposing the stationary plate 1. The drive control circuit 3 applies an alternating voltage to the driving electrodes 2. The movable element 4 is subjected to an electret-forming process. The electret-forming process means a process for making a dielectric kept in a permanently electrically polarized state to hold a constant charge. The driving electrodes 2 extend in a direction perpendicular to the movement direction (the side-to-side direction in the figure) of the movable element 4.

In the shutter device 100 shown in FIG. 1, when a voltage is applied to the driving electrodes 2, the driving electrodes are charged with electricity. At this time, an electrostatic force is exerted between the charge generated in each driving electrode and the constant charge held in the movable element 4. The electrostatic force therebetween is varied by varying the voltage applied to each driving electrode, thereby moving the movable element 4. In the case of FIG. 1, the driving electrodes 2 are provided almost all over the stationary plate 1 except for the area of the opening 5. Since the total area of the driving electrodes 2 on the plate 1 is thus made maximum, the force for driving the movable element 4 is maximized.

Although the opening 5 is square in FIG. 1, the opening can also be made, for example, circular, of course. Further, in the first embodiment, the opening 5 is formed in the stationary plate 1. However, the opening 5 may not always be formed in the plate 1. For instance, light may be passed through a portion other than the stationary plate 1, or the stationary plate 1 and driving electrodes 2 may be formed of a light transmissible material. In these cases, the driving electrodes 2 can be provided almost all over the stationary plate 1.

Figure 2A:
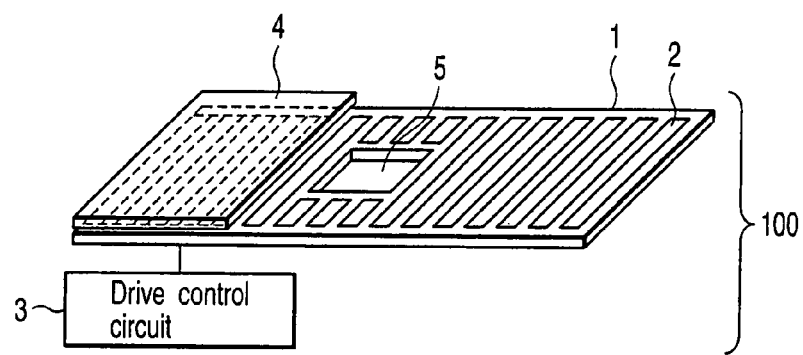
FIGS. 2A and 2B are views useful in explaining the open/close operations of the shutter device.
Figure 2B:
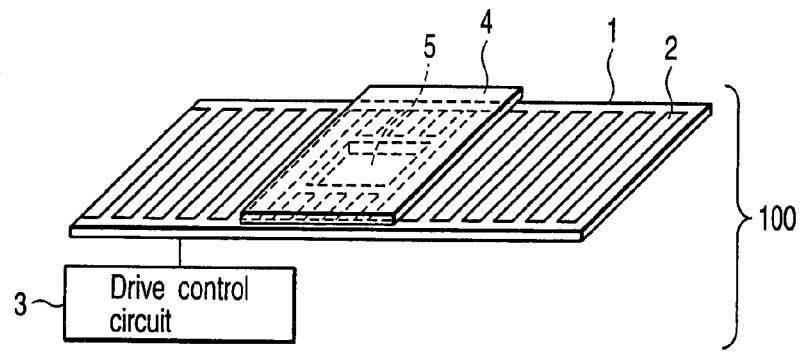

FIGS. 2A and 2B are views useful in explaining the open/close operations of the shutter device shown in FIG. 1. Specifically, FIG. 2A shows a state in which the opening 5 is exposed, i.e., the shutter is open. In this state, the light entering the shutter device 100 passes through the opening 5. FIG. 2B shows a state in which the opening 5 is shielded with the movable element 4, i.e., the shutter is closed.

Figure 3A:
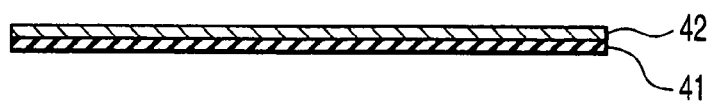
FIGS. 3A to 3C are sectional views useful in explaining movable elements of different structures.

Referring then to FIGS. 3A to 3C and 4, the movable element 4 will be described. FIG. 3A is a sectional view illustrating an example of the movable element 4 shown in FIG. 1. The movable element 4 shown in FIG. 3A is formed of a sheet 41 subjected to an electret-forming process (hereinafter referred to simply as "the sheet 41"), and a metal sheet 42 as a light shield stacked thereon. The sheet 41 may be formed of, for example, fluoroethylene propylene (FEP). The FEP sheet is subjected to, for example, corona discharge for converting the sheet into an electret-formed one.

The stacking of the metal sheet 42 on the sheet 41 significantly reduces the light transmittance of the movable element 4. Further, this process can reduce the entire thickness of the movable element 4 to about several micrometers. As a result, the movable element 4 can be reduced in weight. The thinner the sheet 41, the higher the charging efficiency in the electret-forming process. As a result, the movable element 4 can have a high charge density. The sheet 42 is not limited to a metal sheet. It is sufficient if the sheet 42 has high light-shielding properties.

Figure 3B:
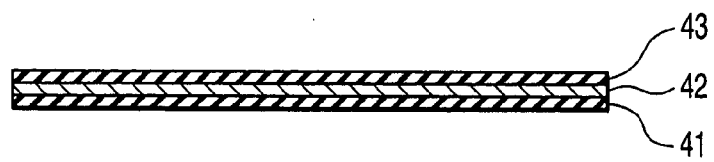

FIG. 3B shows another example of the movable element 4. The movable element 4 shown in FIG. 3B is formed of the sheet 41 subjected to an electret-forming process, a metal sheet 42, and a sheet 43 as a light-absorbing member with a light transmittance of about 1 to 5% (hereinafter referred to simply as "the sheet 43"). These sheets are stacked on each other. The sheet 43 is formed by, for example, coating a dielectric sheet with black paint.

The stacking of the metal sheet 42 and the sheet 43 on the sheet 41 significantly reduces the light transmittance of the movable element 4, and prevents light from being diffusedly reflected from the metal sheet 42. As a result, a light movable element 4 of satisfactory light-shielding properties can be provided. Further, since the sheet 43 can prevent diffused reflection of light, if the shutter device of the embodiment is used in, for example, a camera, the quality of photography is enhanced.

Figure 3C:

FIG. 3C shows yet another example of the movable element 4. The movable element 4 shown in FIG. 3C is formed of the sheet 41 subjected to an electret-forming process, and a sheet 44 (hereinafter referred to simply as "the sheet 44") formed of, for example, plastic or glass having a higher coefficient of elasticity than the sheet 41 stacked on the sheet 41. Since the sheet 44 having a higher coefficient of elasticity is stacked on the sheet 41, the movable element 4 has high rigidity. This enables the movable element 4 to be formed flatter, whereby the distance between the movable element 4 and driving electrodes 2 can be made uniform. As a result, the force of driving the movable element 4 can be increased.

Figure 4:
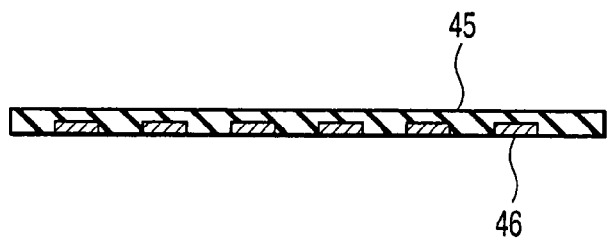
FIG. 4 is a sectional view illustrating an example of a sheet subjected to an electret-forming process, which forms the movable element.

FIG. 4 is a sectional view illustrating another example of the sheet 41. In the sheet shown in FIG. 4, portions 46 thereof are subjected to an electret-forming process. In the example of FIG. 4, the portions 46 are provided at regular intervals. However, they may be provided at different intervals.

The structure of the movable element 4 shown in FIG. 4, in which the intervals of the portions 46 correspond to those of the driving electrodes 2, can receive a stronger force for driving the movable element 4, than the structure in which the entire surface of the movable element is subjected to an electret-forming process.

Figure 5:
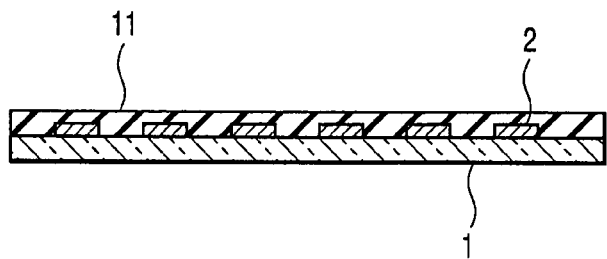
FIG. 5 is a sectional view useful in explaining the structure of a stationary plate.

Referring then to FIG. 5, the stationary plate 1 will be described. FIG. 5 is a sectional view illustrating a structure example of the stationary plate 1 and driving electrodes 2. As shown in FIG. 5, a plurality of driving electrodes 2 are provided on the stationary plate 1. The surface of the stationary plate 1 that is provided with the driving electrodes 2 is coated with an insulation layer 11. In the example of FIG. 5, the stationary plate 1 is formed of glass, the driving electrodes 2 are formed of aluminum, and the insulation layer 11 is formed of a silicon oxide sheet. The insulation layer 11 covering the stationary plate 1 electrically isolates the adjacent driving electrodes from each other, thereby enabling an electrostatic force to be efficiently exerted on the movable element 4.

It is not always necessary to arrange the driving electrodes at regular intervals as shown in FIG. 5. It is sufficient if the electrodes can apply a sufficient electrostatic force to the electret-formed portions of the movable element 4.

Referring now to FIGS. 6A to 6D, the operation principle of the shutter device of the first embodiment will be described. In the movable element 4 shown in FIGS. 6A to 6D, portions arranged at regular intervals are electret-formed portions as in the case of FIG. 4. That is, a plurality of electret-formed portions 46 are provided at regular intervals in a sheet 45. The electret-formed portions 46 are charged so that the surface opposing driving electrodes 2 is negatively charged. Further, the driving electrodes 2 are connected to a drive control circuit 3, and a voltage is applied to the driving electrodes 2 by the drive control circuit 3. It is assumed in the shown example that the drive control circuit 3 is a 3-phase power supply circuit. However, the drive control circuit is not limited to this.

Figure 6A:
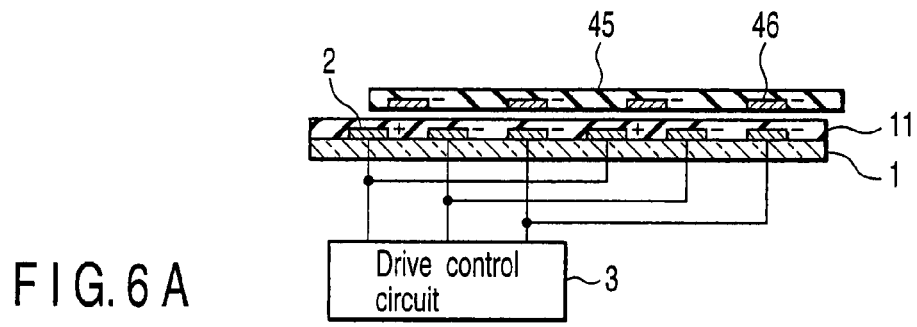
FIGS. 6A to 6D are views useful in explaining the operation principle of the movable element.
Figure 6B:
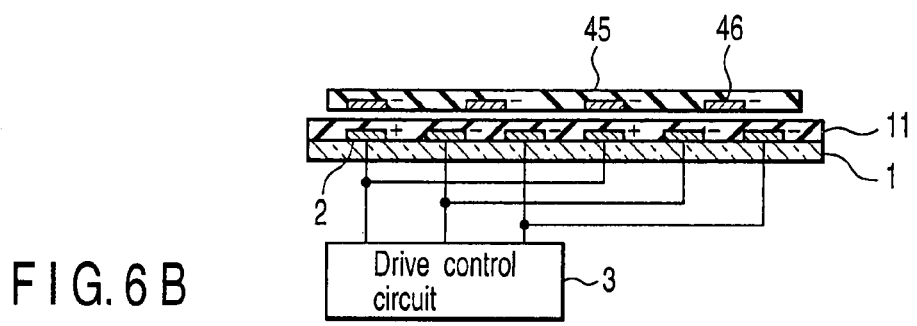
Figure 6C:
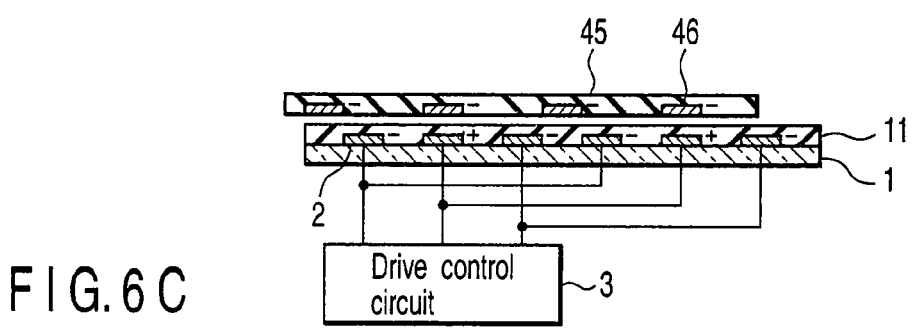
Figure 6D:
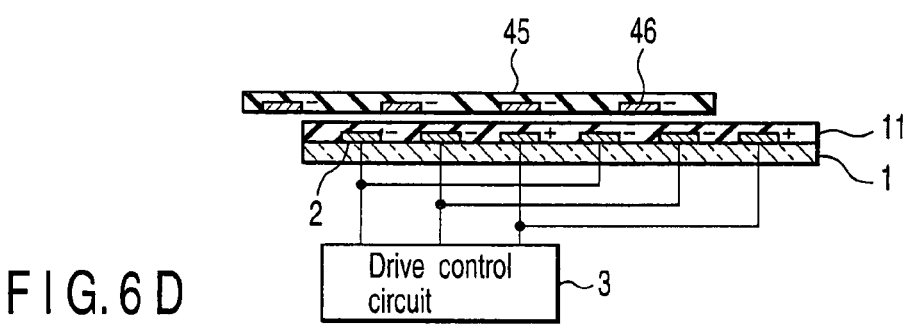

In the state shown in FIG. 6A, assume that the drive control circuit 3 applies a positive voltage in the first phase (it is assumed that the leftmost is the first phase), and a negative voltage in the second and third phases. At this time, the driving electrodes 2, in the first phase, and the movable element 4 are charged with electricity of opposite polarity, therefore they attract each other. On the other hand, the driving electrodes 2, in the second and third phases, and the movable element 4 are charged with electricity of the same polarity, therefore they repel each other. As a result, the movable element 4 moves to the position shown in FIG. 6B. In the state of FIG. 6B, if a negative voltage is applied in the first and third phases, and a positive voltage is applied in the second phase, the movable element 4 moves to the position shown in FIG. 6C. In the state of FIG. 6C, if a negative voltage is applied in the first and second phases, and a positive voltage is applied by the third phase, the movable element 4 moves to the position shown in FIG. 6D. Thus, if a positive voltage is applied in the order of the first, second and third phases, the movable element 4 moves from right to left in the figures. If, on the other hand, a positive voltage is applied in the order of the third, second and first phases, the movable element 4 moves from left to right in the figures.

By moving the movable element 4 as a light-shielding sheet as shown in FIGS. 6A to 6D, the shutter is opened and closed. Since a constant charge exists at the surface of the movable element 4, a stronger driving force can be acquired from a low voltage than in the case of a induction electrostatic actuator.

Figure 7:
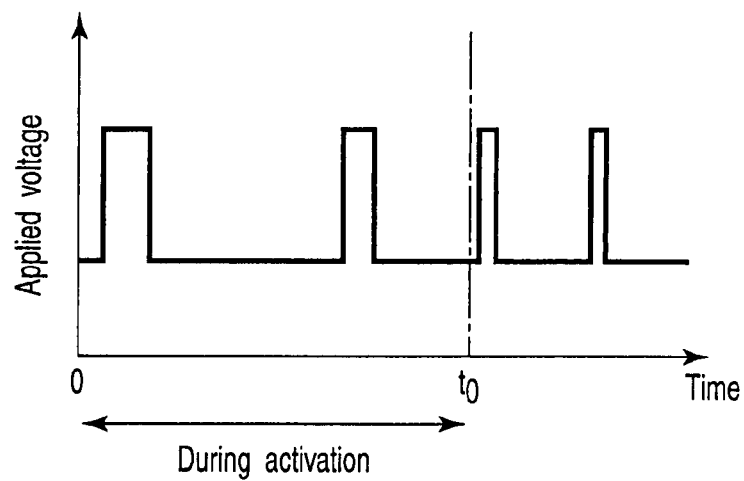
FIG. 7 is a graph illustrating an example pattern of a voltage applied to a driving electrode by a drive control circuit.

FIG. 7 illustrates a voltage pattern example applied to drive the movable element 4. In FIG. 7, the abscissa indicates time and the ordinate indicates the voltage applied to the driving electrodes 2. In the example of FIG. 7, the voltage applied to the driving electrodes 2 is a rectangular wave voltage.

As shown in FIG. 7, in the first embodiment, in the range from time point 0 (the drive start time of the movable element 4) to time point $t_0$, the frequency of the voltage applied to the driving electrodes 2 is increased with time. From time point $t_0$, the frequency of the voltage is kept constant.

Figure 8A:
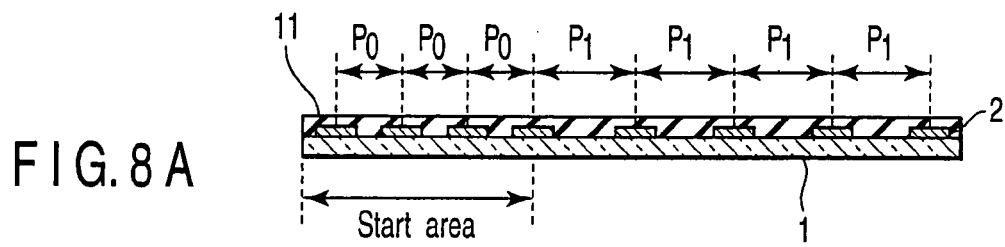
FIGS. 8A to 8C are views illustrating modifications of the driving electrode.
Figure 8B:
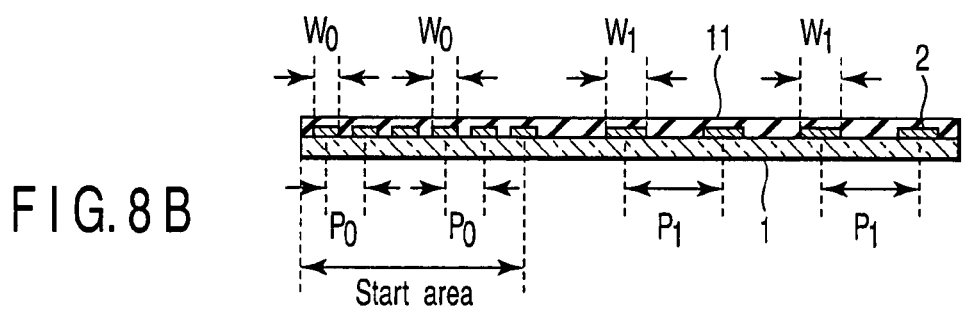
Figure 8C:
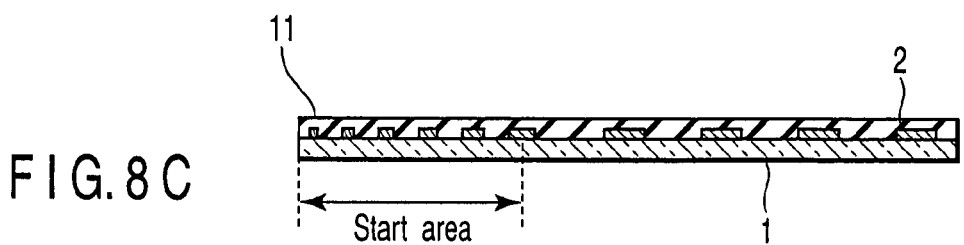

The application of the voltage to the driving electrodes 2 prevents the movable element 4 from being insufficiently accelerated at the start of movement of the element, and hence being unable to reach the position at which it can be attracted by the next driving electrode 2. If the pitch and/or width of the driving electrodes 2 is set as shown in FIGS. 8A to 8C, the same advantage can be acquired even if a voltage of the pattern shown in FIG. 7 is not applied thereto. FIG. 8A shows a case where the pitch $P_0$ of the driving electrodes 2 in the area (start area) in which the movable element 4 is moved from time point 0 to time point $t_0$ is set narrower than the pitch $P_1$ of the driving electrodes 2 in the other area. Further, FIG. 8B shows a case where the pitch $P_0$ in the start area is set narrower than the pitch $P_1$ in the other area, and the width $W_0$ of the driving elements 2 in the start area is set narrower than the width $W_1$ in the other area. FIG. 8C shows a case where the pitch and width of the driving elements in the start area are gradually increased toward the other area (i.e., toward the right in the figure).

Figure 9:
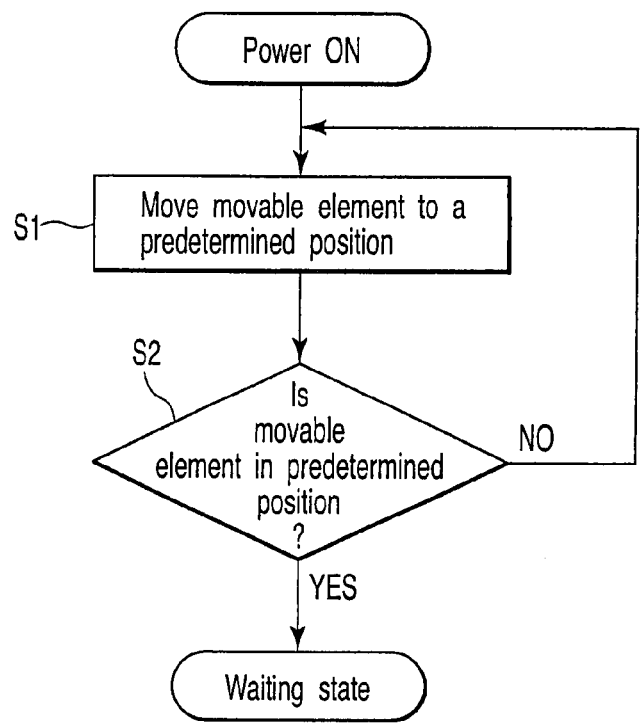

FIG. 9 is a flowchart useful in explaining control performed by the drive control circuit 3 upon turn-on of the power supply. Upon turn-on of the power supply, the drive control circuit 3 performs voltage application to move the movable element 4 to a predetermined position (step S1). Subsequently, the drive control circuit 3 determines whether the movable element 4 is in the predetermined position (step S2). If it is determined that the movable element 4 is not in the predetermined position, the drive control circuit 3 returns the process to step S1 where the movable element 4 is again moved. On the other hand, if it is determined that the movable element 4 is in the predetermined position, the drive control circuit 3 waits for an instruction to move the movable element 4.

Figure 10A:
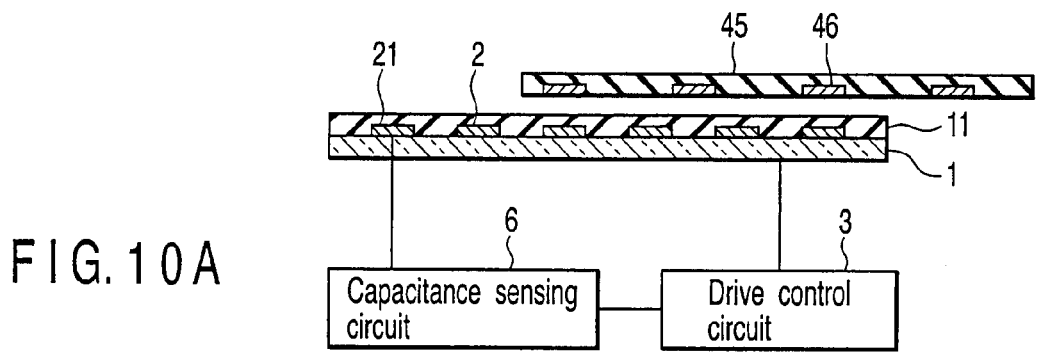
FIGS. 10A and 10B are views illustrating a case where a capacitance sensing circuit is connected to the driving electrode.

The determination at the step S1 is performed using, for example, a capacitance sensing circuit. The capacitance sensing circuit is connected to one of the drive electrodes as shown in FIG. 10A. That is, the capacitance sensing circuit 6 shown in FIG. 10A is connected to the drive control circuit 3 and the driving electrode that is located at the end of the stationary plate 1, i.e., a driving electrode 21. FIG. 10A shows the positional relationship between the stationary plate 1 and movable element 4, assumed when the power supply is off. After turn-on of the power supply, the drive control circuit 3 performs control for moving the movable element 4 to the position (i.e., the predetermined position mentioned in the flowchart of FIG. 9) corresponding to the driving electrode 21 connected to the capacitance sensing circuit 6, as described with reference to FIG. 9.

Figure 10B:
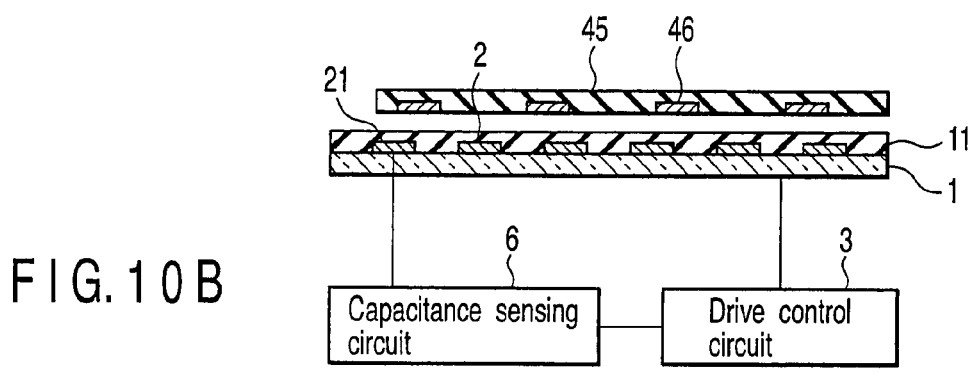

FIG. 10B shows a state in which the movable element 4 reaches the driving electrode 21. When the movable element 4 reaches the driving electrode 21, the capacitance of the capacitor formed of the driving electrode 21 and movable element 4 significantly varies. The variation in capacitance is detected by the capacitance sensing circuit 6. As a result, the drive control circuit 3 determines that the movable element 4 has moved to the predetermined position, and stops the movable element 4.

The control accuracy and driving efficiency of the movable element 4 are enhanced by always moving, to the predetermined position upon turn-on of the power supply, the movable element 4 whose position is not fixed when the power supply is off.

It is preferable to seal the movable element 4 of the shutter device 100 as shown in FIG. 11. FIG. 11 shows an example in which the movable element 4 is completely sealed with the stationary plate 1, protection member 51 and seal member 52. The protection member 51 is, for example, a glass thin plate, and the seal member 52 is formed of silicon. In this state, the movable element 4 is protected from temperature, humidity, dust, etc. As a result, the constant charge held in a sheet subjected to an electret-forming process is prevented from being attenuated by temperature, humidity, dust, etc. In the example of FIG. 11, the driving electrodes 2 are also sealed, therefore they can also be protected from performance degradation.

Second Embodiment

A second embodiment of the invention will now be described. The second embodiment is directed to a thin focal plane shutter device capable of performing shutter driving with low voltage at high speed, which is an application of the shutter device of the first embodiment.

In the case of, for example, an in-lens shutter mechanism, it must be located at the position of a diaphragm. Since the position of the diaphragm is moved when, for example, the lens is focused, a mechanism for moving the entire shutter mechanism is indispensable. This makes it difficult to reduce the size of the in-lens shutter mechanism. On the other hand, in the case of a focal plane shutter mechanism, it is located immediately before an image pickup element, therefore it is not necessary to move the shutter mechanism even when, for example, the lens is focused. Therefore, it is not necessary to employ a mechanism for moving the shutter mechanism, which enables the shutter mechanism to be reduced in size.

FIG. 12 shows a focal plane shutter that comprises a shutter device 101 formed of a stationary plate 1 with an opening 5 and a movable element 4, and a shutter device 102 formed of a stationary plate 19 and movable element 49 and having the same structure as the shutter device 101. In FIG. 12, if, for example, the movable elements 49 and 4 are used as front and rear curtains, respectively, a focal plane shutter to be driven at high speed with low voltage is realized. Further, FIG. 12 shows a state in which the front and rear curtains are both open. It is desirable that the driving voltage applied to the driving electrodes 2 on the stationary plate 19 should have the same phase as that of the driving voltage applied to the driving electrodes 2 on the stationary plate 1. If the driving voltages are made to have the same phase, uneven exposure can be avoided.

Various modifications as explained in the first embodiment can also be employed in the focal plane shutter shown in FIG. 12. In addition, so-called direct metering, in which metering is performed using light reflected from the front curtain of a focal plane shutter, may be used as a metering scheme for a camera having a focal plane shutter. The focal plane shutter of the second embodiment may be constructed to be compatible with such direct metering. In this case, it is sufficient if the front curtain 49 has a predetermined pattern that provides a standard reflectance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A shutter device comprising:
   a first shutter unit including a first stationary plate with a plurality of driving electrodes arranged with a first predetermined pitch, and a first movable element opposing the first stationary plate, the first movable element including a sheet subjected to an electret-forming process; and
   a second shutter unit including a second stationary plate with a plurality of driving electrodes arranged with a second predetermined pitch, and a second movable element opposing the second stationary plate, the second movable element including a sheet subjected to an electret-forming process, and
   wherein the plurality of driving electrodes arranged with the first and second predetermined pitches are arranged on the first and second stationary plates with a first pitch in a start area ranging from a position at which the first and second moveable elements start to move, to a predetermined position, and with a second pitch in an area other than the start area; and
   a pitch of the first pitch interval in the start area is narrower than a pitch of the second pitch interval which is in an area other than the start area.

2. The shutter device according to claim 1, wherein the plurality of driving electrodes arranged with the first and second predetermined pitch on the first and second stationary plate have a first width in the start area, and have a second width wider than the first width in the area other than the start area.

3. The shutter device according to claim 2, further comprising a drive control unit configured to drive the front curtain and the rear curtain at an identical phase.

4. The shutter device according to claim 2, wherein at least the first movable element and the second movable element are sealed with a seal member.

* * * * *